United States Patent
Fu et al.

(10) Patent No.: US 12,418,718 B2
(45) Date of Patent: Sep. 16, 2025

(54) IMAGE PROCESSING SYSTEM AND IMAGE PROCESSING METHOD

(71) Applicant: FANUC CORPORATION, Yamanashi (JP)

(72) Inventors: Wanfeng Fu, Yamanashi (JP); Yuta Namiki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 277 days.

(21) Appl. No.: 18/043,039

(22) PCT Filed: Dec. 3, 2021

(86) PCT No.: PCT/JP2021/044535
§ 371 (c)(1),
(2) Date: Feb. 27, 2023

(87) PCT Pub. No.: WO2022/124232
PCT Pub. Date: Jun. 16, 2022

(65) Prior Publication Data
US 2023/0328372 A1    Oct. 12, 2023

(30) Foreign Application Priority Data
Dec. 10, 2020   (JP) .................................. 2020-204868

(51) Int. Cl.
*H04N 23/67*     (2023.01)
*G06T 7/80*      (2017.01)
*H04N 23/61*     (2023.01)

(52) U.S. Cl.
CPC ............... *H04N 23/67* (2023.01); *G06T 7/80* (2017.01); *H04N 23/61* (2023.01)

(58) Field of Classification Search
CPC ...... H04N 23/67; H04N 23/61; H04N 17/002; H04N 13/246; G06T 7/80; G06T 7/73;
(Continued)

(56) References Cited

U.S. PATENT DOCUMENTS

2006/0017720 A1*  1/2006  Li .............................. G06T 7/80
                                                              345/419
2014/0039666 A1   2/2014  Kim
(Continued)

FOREIGN PATENT DOCUMENTS

CN      110136208 A    8/2019
JP      H8210816 A     8/1996
(Continued)

*Primary Examiner* — Abdelaaziz Tissire
(74) *Attorney, Agent, or Firm* — HAUPTMAN HAM, LLP

(57) ABSTRACT

An image processing system includes: an industrial machine; a visual sensor; a visual pattern arranged on a part to be detected, for identifying a relative positional relationship between the visual sensor and the visual pattern; an image processing unit that determines the relative positional relationship between the visual sensor and the visual pattern on the basis of an image of the visual pattern captured by the visual sensor; and a focusing operation control unit that, with the visual pattern within the field of view of the visual sensor, causes the visual sensor to capture the visual pattern while changing the relative positions of the visual sensor and the visual pattern in a predetermined direction with reference to the visual pattern, on the basis of the determined relative positional relationship to obtain a focus degree of the visual pattern, whereby the visual sensor is focused on the visual pattern.

5 Claims, 5 Drawing Sheets

(58) Field of Classification Search
CPC ... G06T 7/70; G06T 7/97; G05B 2219/39045;
G05B 2219/39008; G05B 2219/39022;
G05B 2219/39024; G05B 2219/37097;
G05B 19/4086; G05B 2219/39029; G05B
2219/39016; G05B 2219/39047; G05B
2219/40003; G05B 2219/39527; G05B
2219/39397; B25J 9/1692; B25J 9/1697;
G03B 43/00; G03B 13/36; Y10S 901/02;
Y10S 901/14; Y10S 901/00; Y10S 901/01
See application file for complete search history.

(56) References Cited

U.S. PATENT DOCUMENTS

| | | | | |
|---|---|---|---|---|
| 2016/0354929 | A1* | 12/2016 | Ishige | B25J 9/1697 |
| 2018/0333859 | A1* | 11/2018 | Ban | B25J 19/023 |
| 2018/0338090 | A1* | 11/2018 | Iida | G06T 7/73 |
| 2022/0114703 | A1* | 4/2022 | Kang | G06T 3/40 |

FOREIGN PATENT DOCUMENTS

| | | | |
|---|---|---|---|
| JP | 2010-079845 | A | 4/2010 |
| JP | 2011-221612 | A | 11/2011 |
| JP | 2014128845 | A | 7/2014 |
| JP | 2014180720 | A | 9/2014 |
| JP | 201697474 | A | 5/2016 |
| JP | 2016221645 | A | 12/2016 |
| JP | 2017-212812 | A | 11/2017 |
| JP | 201891774 | A | 6/2018 |
| JP | 2018192569 | A | 12/2018 |
| JP | 2018194542 | A | 12/2018 |
| JP | 2020-047049 | A | 3/2020 |

* cited by examiner

IMAGE PROCESSING SYSTEM AND IMAGE PROCESSING METHOD

RELATED APPLICATIONS

The present application is a National Phase of International Application No. PCT/JP2021/044535 filed Dec. 3, 2021, which claims priority to Japanese Application No. 2020-204868, filed Dec. 10, 2020.

FIELD

The present invention relates to an image processing system and an image processing method.

BACKGROUND

Systems configured to install a visual sensor on a movable part of an industrial robot or another industrial machine and perform visual inspection, position detection, and the like of a workpiece by image processing are known (for example, see PTL 1). In order to install a visual sensor on a movable part of an industrial robot or the like and perform position detection and the like of a workpiece, finding a relative positional relation of a coordinate system of the visual sensor with a standard coordinate system set to the industrial robot or the like, i.e., calibration of the visual sensor is required. Various techniques are known in the relevant field as technologies for calibration of a visual sensor (such as PTLs 2 to 5).

In a robot system as described above, adjustment needs to be performed in order to focus a camera on an inspection target position. In such a case, the distance between a target object and the camera is generally adjusted by a user performing adjustment by turning a focusing ring of the camera or the user moving the robot by operating a teach pendant. On the other hand, PTL 5 describes that "an image processing system SYS determines a normal line V with respect to a set measurement point Wp on a determined workpiece W according to placement status of the workpiece W and varies the position and the attitude of a two-dimensional camera 310 in such a way that the determined normal line V matches the optical axis of the two-dimensional camera 310 (S1). By varying the distance between the two-dimensional camera 310 and the measurement point Wp in such a way that the determined normal line V matches the optical axis of the two-dimensional camera 310, the image processing system SYS focuses the two-dimensional camera 310 on the measurement point Wp." (Abstract).

CITATION LIST

Patent Literature

[PTL 1] Japanese Unexamined Patent Publication (Kokai) No. 2018-91774 A

[PTL 2] Japanese Unexamined Patent Publication (Kokai) No. 2014-128845 A

[PTL 3] Japanese Unexamined Patent Publication (Kokai) No. H8-210816 A

[PTL 4] Japanese Unexamined Patent Publication (Kokai) No. 2018-192569 A

[PTL 5] Japanese Unexamined Patent Publication (Kokai) No. 2018-194542 A

SUMMARY

Technical Problem

While PTL 5 describes a configuration of performing focusing by adjusting the distance between a camera and a specific workpiece, the configuration in PTL 5 requires complex processing such as processing for specifying the shape of the workpiece, processing for determining the placement state of the workpiece, and processing for finding a normal line of the workpiece, and settings for the processing. Further, the workpiece may have various shapes, and therefore acquisition of placement information of the workpiece, acquisition of a normal line, and/or calculation of a degree of focusing may not be correctly performed.

Solution to Problem

An aspect of the present disclosure relates to an image processing system including: an industrial machine; a visual sensor; a visual pattern for determining a relative positional relation between the visual sensor and the visual pattern placed at a detection target spot; an image processing unit configured to determine a relative positional relation between the visual sensor and the visual pattern from an image of the visual pattern captured by the visual sensor; and a focusing operation control unit configured to cause the visual sensor to focus on the visual pattern by causing the visual sensor to capture an image of the visual pattern while changing a relative position between the visual sensor and the visual pattern in a predetermined direction with the visual pattern as a basis, based on the determined relative positional relation, and finding a degree of focusing of the visual pattern, in a state of the visual pattern being captured in a visual field of the visual sensor.

Another aspect of the present disclosure relates to an image processing method including: determining a relative positional relation between a visual sensor and a visual pattern placed at a detection target spot from an image of the visual pattern captured by the visual sensor; and causing the visual sensor to focus on the visual pattern by causing the visual sensor to capture an image of the visual pattern while changing a relative position between the visual sensor and the visual pattern in a predetermined direction with the visual pattern as a basis, based on the determined relative positional relation, and finding a degree of focusing of the visual pattern, in a state of the visual pattern being captured in a visual field of the visual sensor.

Advantageous Effects of Invention

Placing a visual pattern at a detection target spot enables a visual sensor to automatically focus on the spot where the visual pattern is placed.

The objects, the features, and the advantages, and other objects, features, and advantages will become more apparent from the detailed description of typical embodiments of the present invention illustrated in accompanying drawings.

DESCRIPTION OF EMBODIMENTS

Next, an embodiment of the present disclosure will be described with reference to drawings. In referenced drawings, similar components or functional parts are given similar signs. In order to facilitate understanding, the drawings use different scales as appropriate. Further, a configuration illustrated in a drawing is an example for implementing the present invention, and the present invention is not limited to the illustrated configuration.

Figure 1:
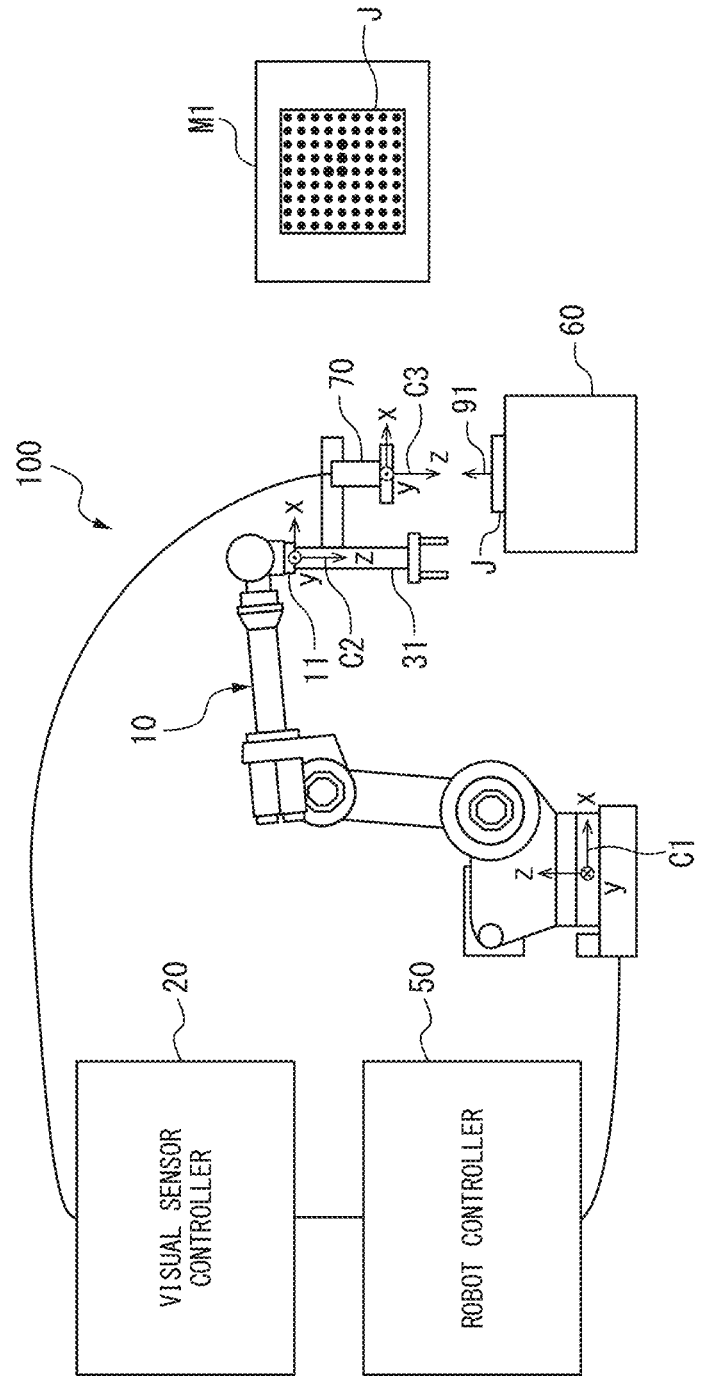
FIG. 1 is a diagram illustrating a device configuration of a robot system (image processing system) according to an embodiment.

FIG. 1 is a diagram illustrating a device configuration of a robot system 100 according to an embodiment. As illustrated in FIG. 1, the robot system 100 includes an industrial robot (hereinafter referred to as a robot) 10 as an industrial machine, a robot controller 50 controlling the robot 10, a visual sensor 70, and a visual sensor controller 20 controlling the visual sensor 70. The robot system 100 is a system for recognizing the position of a workpiece, based on an image of the workpiece captured by the visual sensor 70, and executing predetermined tasks such as inspection, handling, and machining of the workpiece. While the robot 10 is a vertical articulated robot in the example in FIG. 1, another type of robot may be used.

The visual sensor controller 20 and the robot controller 50 are connected through a communication interface and can exchange various types of information.

A tool 31 as an end effector is installed on the tip surface of a flange 11 of an arm tip of the robot 10. For example, the tool 31 is a hand for gripping a workpiece. The robot 10 executes a predetermined task such as handling of a workpiece in accordance with control by the robot controller 50. The visual sensor 70 is installed on a supporting part of the tool 31 (i.e., a predetermined movable part of the robot 10).

The visual sensor 70 is controlled by the visual sensor controller 20 and captures an image of an image capture target such as a workpiece. A common two-dimensional camera may be used as the visual sensor 70, or a three-dimensional sensor such as a stereo camera may be used. The visual sensor 70 includes an image sensor (such as a CCD or a CMOS) receiving a subject image and performing photoelectric conversion on the image, an optical lens condensing the subject image onto the image sensor, and the like. The visual sensor 70 transmits captured image data to the visual sensor controller 20. Note that FIG. 1 illustrates an image M1 of a calibration jig J captured by the visual sensor 70 in a state illustrated in FIG. 1.

Figure 2:
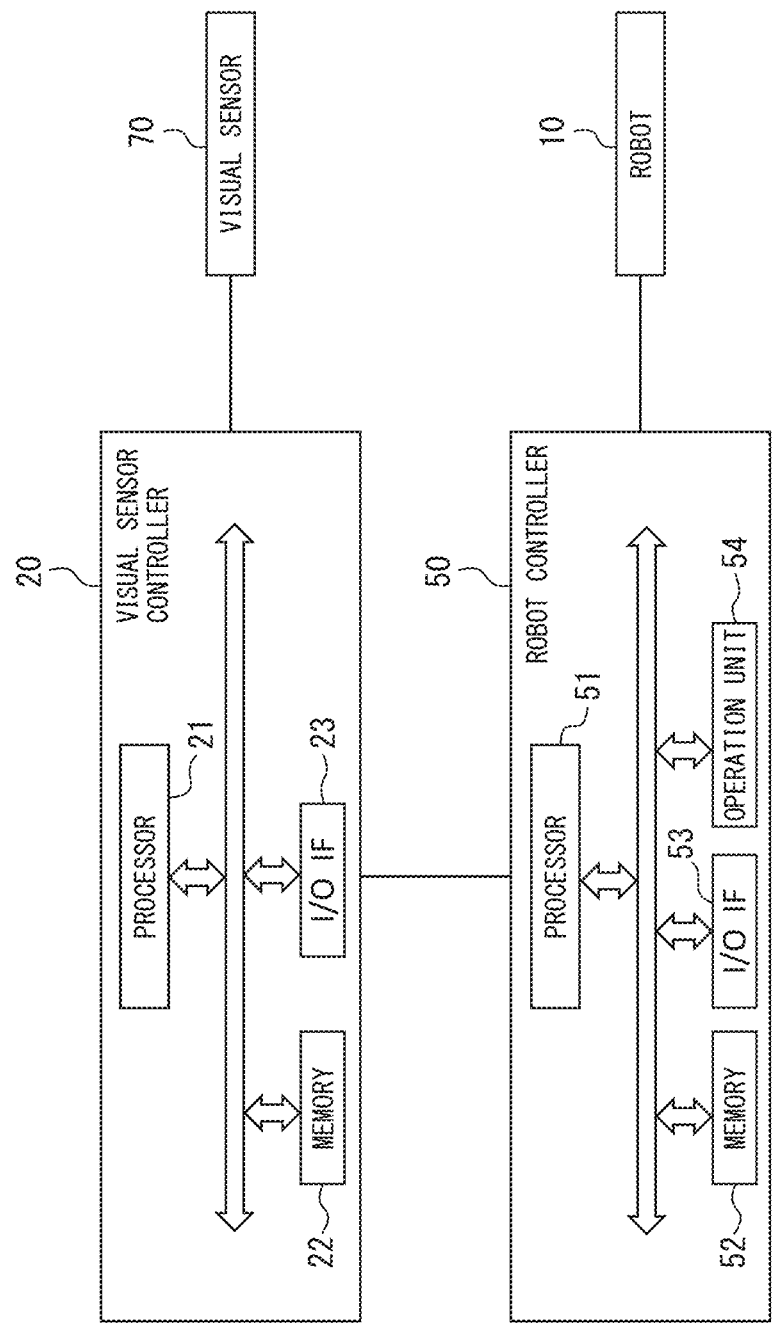
FIG. 2 is a diagram illustrating schematic hardware configurations of a visual sensor controller and a robot controller.

FIG. 2 is a diagram illustrating schematic hardware configurations of the visual sensor controller 20 and the robot controller 50. The visual sensor controller 20 may be configured as a common computer in which a processor 21 is connected to a memory 22 (including a ROM, a RAM, a nonvolatile memory, and the like), an input-output interface 23 for communicating with an external device, and the like through a bus, as illustrated in FIG. 2. The robot controller 50 may be configured as a common computer in which a processor 51 is connected to a memory 52 (including a ROM, a RAM, a nonvolatile memory, and the like), an input-output interface 53 for communicating with an external device, an operation unit 54 including various operation switches and the like, and the like through a bus. The robot controller 50 may be further connected to a teaching device (such as a teach pendant) for performing teaching of the robot 10. While a device configuration in which the visual sensor controller 20 and the robot controller 50 are separate devices is illustrated in the present embodiment, the visual sensor controller 20 and the robot controller 50 may be configured to be the same device. For example, functions of the visual sensor controller 20 may be incorporated into the robot controller 50.

A robot coordinate system C1 is set to the robot 10. The robot coordinate system C1 is a control coordinate system for controlling operation of each movable element in the robot 10 and is fixed in a three-dimensional space. While it is assumed as an example in the present embodiment that the origin of the robot coordinate system C1 is set at the center of a base part of the robot 10, the robot coordinate system C1 may be set to have a different position and a different attitude.

A flange coordinate system C2 is set on the tip surface of the flange 11. The flange coordinate system C2 is a control coordinate system for controlling the position and the attitude of the flange 11 in the robot coordinate system C1. While it is assumed as an example in the present embodiment that the origin of the flange coordinate system C2 is placed at the center of the tip surface of the flange 11 and a z-axis of the system is set in such a way as to match the central axis of the flange 11, the flange coordinate system C2 may be set to have a different position and a different attitude.

When moving a wrist (tool 31) of the robot 10, the robot controller 50 (processor 51) sets the flange coordinate system C2 in the robot coordinate system C1 and controls a servo motor of each joint in the robot 10 in such a way as to place the flange 11 at the position and the attitude indicated by the set flange coordinate system C2. Thus, the robot controller 50 can position the flange 11 (tool 31) at any position and any attitude in the robot coordinate system C1.

A sensor coordinate system C3 is set to the visual sensor 70. The sensor coordinate system C3 is a coordinate system for defining coordinates of each pixel in image data captured by the visual sensor 70 and is set with respect to the visual sensor 70 in such a way that the origin of the system is placed at the center of a light-receiving surface (or an optical lens) of the image sensor in the visual sensor 70, an x-axis and a y-axis of the system are placed parallel to a lateral direction and a longitudinal direction of the image sensor, and the z-axis of the system matches the line of sight (optical axis) of the visual sensor 70.

As will be described in detail later, the robot system 100 is configured as an image processing system performing a focusing operation by moving the visual sensor 70 in a predetermined direction with respect to a visual pattern for determining a relative positional relation between the visual sensor 70 and the visual pattern placed at a detection target spot of the visual sensor 70 by capturing an image of the visual pattern. According to the present embodiment, the detection target spot of the visual sensor 70 is the top surface of a base 60 on which a workpiece is equipped, and the visual pattern is formed on a calibration jig J. The visual pattern has only to have a visually recognizable form such as a pattern using paint or an engraved mark (unevenness). The visual pattern may be directly formed at the detection target position (the top surface of the base 60). A visual pattern herein includes various visual displays such as a pattern, a mark, an indicator, an identification sign, and a symbol. Using the visual pattern in acquisition of a relative positional relation with the visual sensor 70 enables high-precision acquisition of a relative positional relation.

In particular, precision can be enhanced, compared with a configuration of finding a relative positional relation between a camera and a specific workpiece as described in aforementioned PTL 5.

The following description focuses on a function of the robot system 100 as such an image processing system.

Figure 3:
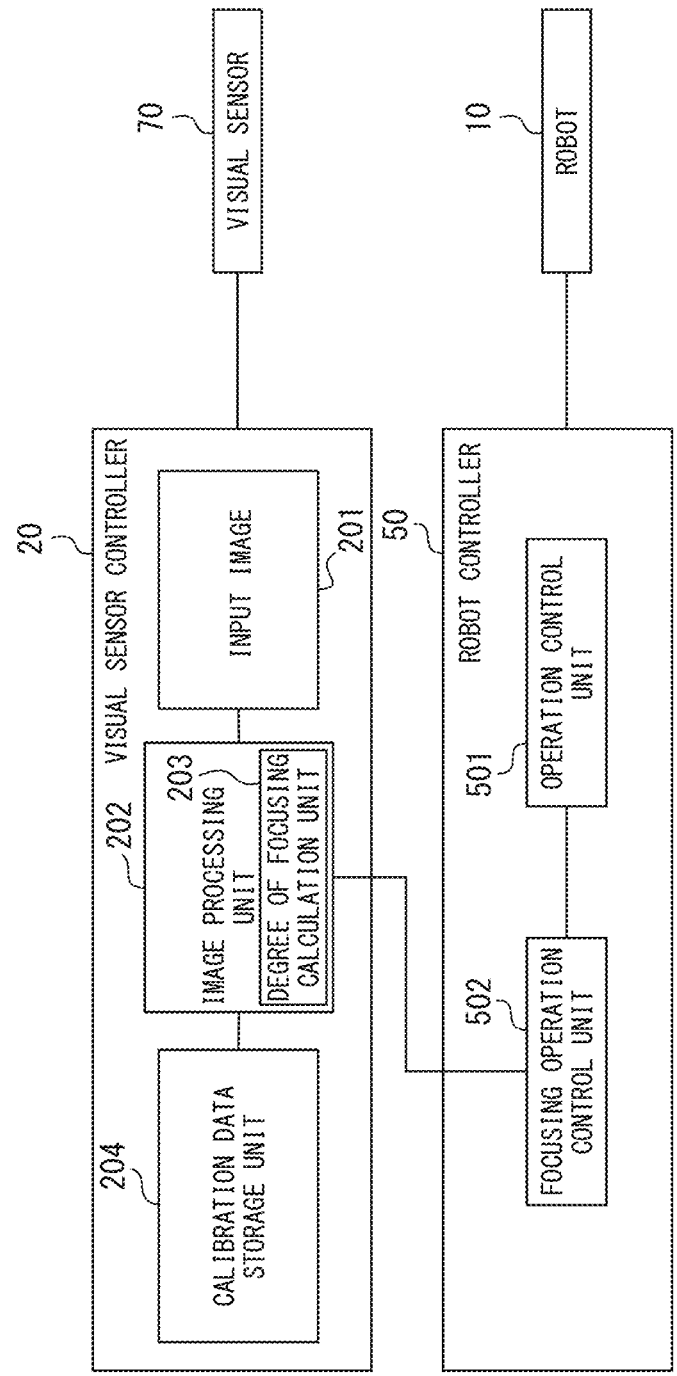
FIG. 3 is a functional block diagram illustrating functional configurations of the visual sensor controller and the robot controller.

FIG. 3 is a functional block diagram illustrating functional configurations of the visual sensor controller 20 and the robot controller 50 when attention is focused on the function of the robot system 100 as an image processing system. As illustrated in FIG. 3, the visual sensor controller 20 includes an image processing unit 202 executing image processing on an input image 201 captured by the visual sensor 70 and a calibration data storage unit 204 storing calibration data determining a relative position of the visual sensor 70 (sensor coordinate system C3) with respect to a standard coordinate system (the robot coordinate system C1 or the flange coordinate system C2) set to the robot 10.

For example, as a function of providing handling of a workpiece and the like, the image processing unit 202 has a function of detecting a workpiece from an input image by using a model pattern and detecting the position and the attitude of the workpiece. Furthermore, the image processing unit 202 according to the present embodiment includes a degree of focusing calculation unit 203 calculating a degree of focusing of a target object captured in a captured image.

The calibration data storage unit 204 stores calibration data of the visual sensor 70. For example, the calibration data storage unit 204 is a nonvolatile memory (such as an EEPROM). The calibration data of the visual sensor 70 include internal parameters and an external parameter of the visual sensor 70 (camera). The internal parameters include optical data such as lens distortion and a focal distance. The external parameter is the position of the visual sensor 70 with a predetermined reference position (such as the position of the flange 11) as a basis.

A geometric transformation characteristic inside the camera and a geometric relation between a three-dimensional space where an object exists and a two-dimensional image plane are found by using the calibration data, and furthermore, the three-dimensional spatial positions of the visual sensor 70 and the calibration jig J can be uniquely determined from a characteristic of the calibration jig J and an image of the calibration jig J captured by the visual sensor 70. In other words, the position and the attitude of the calibration jig with the position of the visual sensor 70 as a basis can be found from information about the calibration jig J in an image captured by using the calibrated visual sensor 70.

Figure 4:
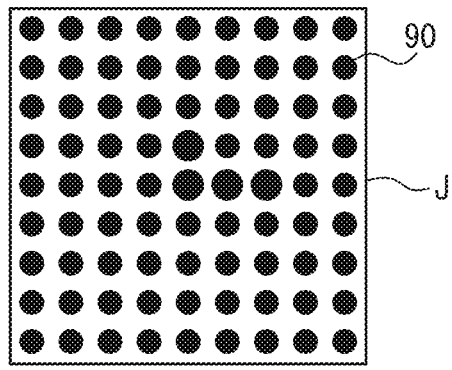
FIG. 4 is a plan view of a calibration jig.

FIG. 4 is a plan view of the calibration jig J. Various calibration jigs known in the relevant field allowing the position and the attitude of a calibration jig to be found from an image captured by the visual sensor 70 with the position of the visual sensor 70 as a basis can be used as the calibration jig J. The calibration jig J in FIG. 4 is a jig allowing acquisition of information required for calibration of the visual sensor 70 by capturing an image of a dot pattern placed on a plane by the visual sensor 70 and satisfies the following three requirements: (1) grid point spacing of the dot pattern is known, (2) a certain number of grid points or more exist, and (3) a grid point to which each grid point corresponds is uniquely determinable. Without being limited to a jig in which a characteristic such as a predetermined dot pattern is placed on a two-dimensional plane as illustrated in FIG. 4, the calibration jig J may be a jig in which a characteristic is placed on a three-dimensional solid body and has only to allow acquisition of three-dimensional positional information including positional information in a height direction (the direction of an arrow 91 in FIG. 1) in addition to two-dimensional positional information (the X-direction and the Y-direction). Further, the calibration jig J may be the same jig that is used when the calibration data of the visual sensor 70 are acquired or may be different. Note that the internal parameters of the aforementioned calibration data are used in order to calculate the position and the attitude of a dot pattern with the position of the visual sensor 70 as a basis from an image of the dot pattern captured by the visual sensor 70. While the calibration jig J including the dot pattern as illustrated in FIG. 4 is used as a target object for finding the position and the attitude of the target object viewed from an image capture device in the present embodiment, any type of target object allowing the position and the attitude of the target object viewed from the image capture device (visual sensor 70) to be found may be used instead.

The calibration jig J according to the present embodiment is installed at a target location on which the visual sensor 70 focuses (i.e., the top surface of the base 60).

As illustrated in FIG. 3, the robot controller 50 includes an operation control unit 501 controlling operation of the robot 10 in accordance with an operation program. Furthermore, the robot controller 50 according to the present embodiment includes a focusing operation control unit 502 performing control of moving the robot 10, based on a degree of focusing calculated by the degree of focusing calculation unit 203, and moving the visual sensor 70 to an in-focus position.

Note that a functional block in the visual sensor controller 20 or the robot controller 50 illustrated in FIG. 3 may be provided by executing various types of software stored in the memory by the processor (CPU) in the visual sensor controller 20 or the robot controller 50 or may be provided by a configuration mainly based on hardware such as an application specific integrated circuit (ASIC).

Figure 5:
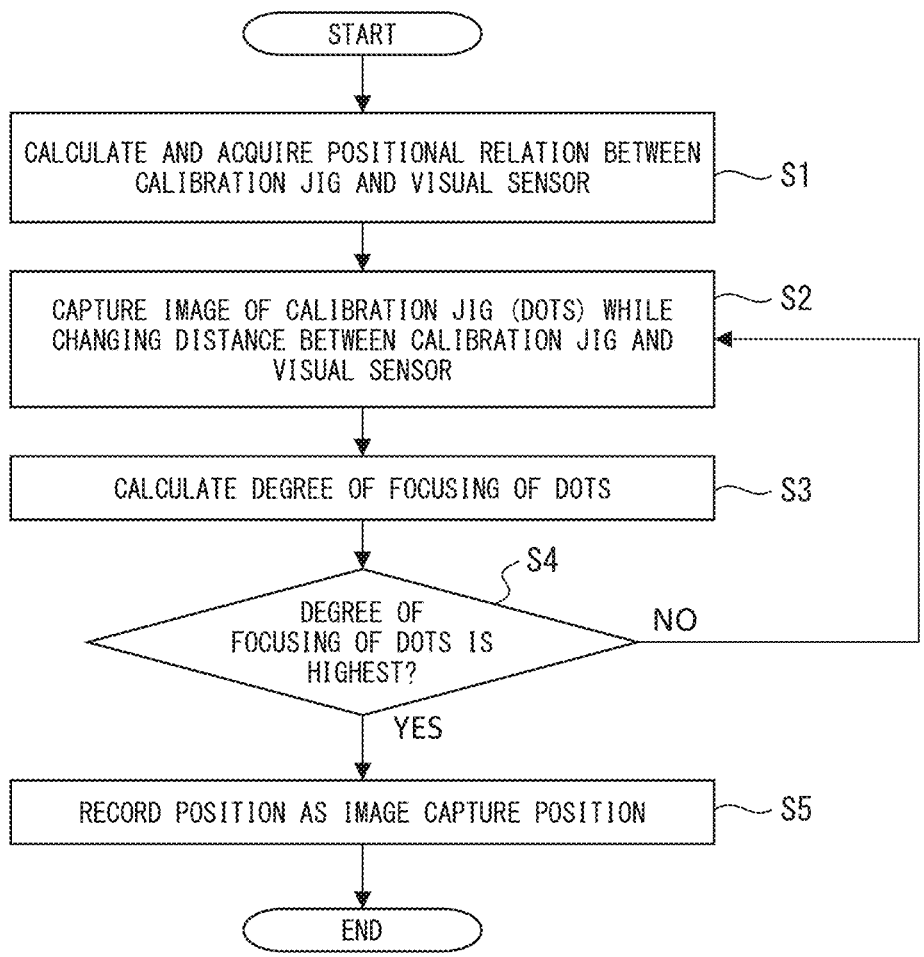
FIG. 5 is a flowchart illustrating a focusing operation.

FIG. 5 is a flowchart illustrating a flow of a focusing operation (image processing method) by the focusing operation control unit. It is assumed that calibration data of the visual sensor 70 are previously stored in the calibration data storage unit 204. The focusing operation in FIG. 5 is executed under control by the processor 51 in the robot controller 50.

First, the focusing operation control unit 502 calculates and acquires a positional relation between the calibration jig J and the visual sensor 70, based on an image of the calibration jig J captured by the visual sensor 70. In this case, the focusing operation control unit 502 uses the calibration data stored in the calibration data storage unit J.

By using the relative positional relation between the visual sensor 70 and the calibration jig J acquired in step S1, the focusing operation control unit 502 captures an image of the calibration jig J while moving the visual sensor 70 in such a way that the optical axis of the visual sensor 70 is parallel to the normal direction of the top surface of the calibration jig J (the direction of the arrow 91 in FIG. 1) (step S2). At this time, the focusing operation control unit 502 causes the degree of focusing calculation unit 203 to calculate a degree of focusing of an image of a target object (i.e., dots of the calibration jig J) captured in the image (step S3).

Then, by comparing the degree of focusing calculated by the degree of focusing calculation unit 203 with a reference value (degree of focusing reference value) as a value when the degree of focusing of the dots of the calibration jig J is highest, the focusing operation control unit 502 determines whether the degree of focusing acquired in step S3 is the highest degree of focusing (step S4). The reference value (degree of focusing reference value) used here may be previously stored by the robot controller 50 (focusing operation control unit 502); or for example, the focusing operation control unit 502 may perform an operation of moving the visual sensor 70 in a predetermined moving range and setting the highest degree of focusing as the degree of focusing reference value. When the degree of focusing is not determined to be highest (S4: NO), the focusing operation control unit 502 continues the processing of checking the degree of focusing while moving the visual sensor 70 (steps S2 to S4). When the degree of focusing is determined to be highest (S4: YES), the focusing operation control unit 502 records the position of the visual sensor 70 when the degree of focusing is highest (in-focus position) as an image capture position (step S5).

The degree of focusing calculation unit 203 may employ various calculation techniques known in the relevant field, such as a phase difference detection method and a contrast detection method, as the technique for calculating a degree of focusing. As an example, the degree of focusing calculation unit 203 may use a technique of, when reliability of a degree of focusing detected by a phase difference detection method is determined to be low, selecting a pixel range in which the phase difference detection method is used, based on a detection result by a contrast detection method, and by using a signal in the selected pixel range, calculating a degree of focusing by the phase difference detection method, as described in Japanese Unexamined Patent Publication (Kokai) No. 2013-29803 A. The degree of focusing calculation unit 203 may acquire data used for calculation of a degree of focusing from a functional component for calculation of focusing in the visual sensor 70.

A predetermined operating range in which the visual sensor 70 is moved in the processing in steps S2 to S4 may be determined based on an adjustment range of the focal distance of the camera. For example, the robot 10 may be controlled in such a way as to move the visual sensor 70 within a range of an image capture distance determined based on a focusing range of a focusing ring in the visual sensor 70. Since the positional relation between the visual sensor 70 and the calibration jig J is known by step S1, such movement control of the visual sensor 70 is enabled.

The image capture position recorded in step S5 is used as an image capture position for positioning the visual sensor 70 when a predetermined task, such as visual inspection of a workpiece placed on the top surface of the base 60, is executed. Thus, the focusing operation in FIG. 5 enables automatic positioning of the visual sensor 70 at a position where the sensor focuses on a position where the calibration jig J is installed. In other words, focusing of the visual sensor 70 can be automatically and efficiently performed.

An example of calibration of the visual sensor 70 being previously performed (i.e., a case of the visual sensor controller 20 previously holding calibration data) has been described above; however, when calibration of the visual sensor 70 is not performed (i.e., in a case of the visual sensor controller 20 not holding calibration data), the robot controller 50 and the visual sensor controller 20 may acquire calibration data by using various calibration techniques (such as aforementioned PTLs 2 to 5) known in the relevant field.

As described above, the calibration jig J is used in the focusing control operation in FIG. 5, according to the present embodiment, and therefore calibration can be easily performed on the spot by using the calibration jig J when the focusing control operation in FIG. 5 is performed. While a method for calibrating a camera is in itself a well-known technique and therefore description thereof is omitted, such a method is described in detail in, for example, "An Efficient and Accurate Camera Calibration Technique for 3D Machine Vision" by Roger Y. Tsai (CVPR, pp. 364 to 374, 1986 IEEE). As a specific means, a camera can be calibrated by causing a jig such as the calibration jig J illustrated in FIG. 4 (a dot pattern plate on which dots are formed in a known geometric placement) to intersect with the optical axis of the camera at right angles and performing measurement at the positions of two known spots.

An example of an image processing technique for determining the attitude of the sensor coordinate system C3 with a standard coordinate system set to the robot 10 (the robot coordinate system C1 or the flange coordinate system C2) as a basis will be described. The focusing operation control unit 502 may be configured to be further responsible for such a function. Making the attitude of the sensor coordinate system C3 with respect to the standard coordinate system set to the robot 10 known by the technique described here enables the optical axis of the visual sensor 70 to be directed in a predetermined direction (such as a normal direction) with respect to the calibration jig J in the aforementioned focusing operation.

Figure 6:
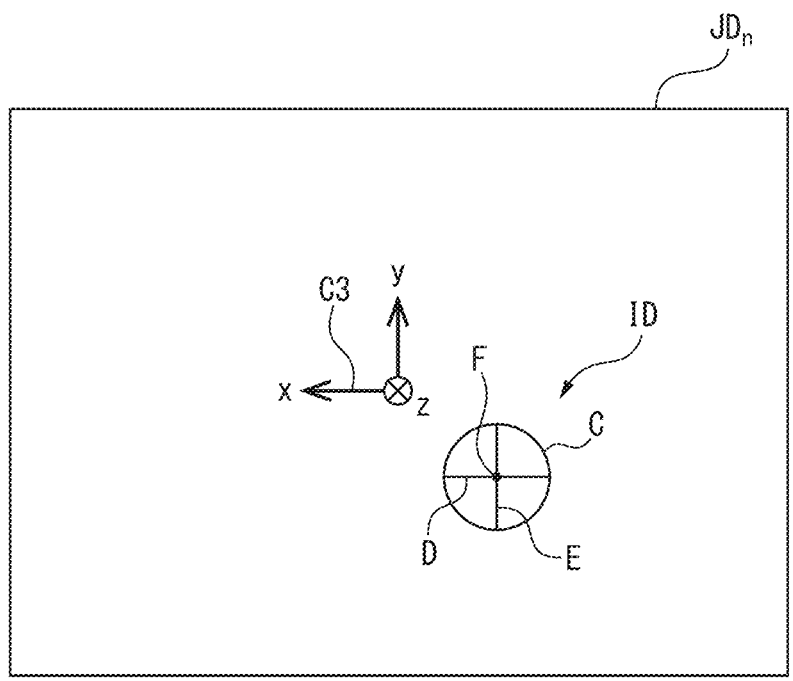
FIG. 6 is a diagram illustrating an example of image data of an indicator captured by a camera.

In this example, data of the attitude of the visual sensor 70 in the standard coordinate system are acquired based on image data of an indicator ID captured by the visual sensor 70. FIG. 6 illustrates an example of the indicator ID. The indicator ID is provided at a detection target position (the top surface of the base 60) and is composed of a circular line C and straight lines D and E orthogonal to each other. For example, the indicator ID has only to have a visually recognizable form such as a pattern using paint or an engraved mark (unevenness) formed on the top surface of the base 60.

The robot controller 50 (focusing operation control unit 502) finds the attitude of the sensor coordinate system C3 with the standard coordinate system set to the robot 10 as a basis in accordance with the following procedures.

(A1) An image of the indicator ID is captured and image data $JD_0$ of the indicator ID are acquired in a state of the visual sensor 70 being placed at an initial position $PS_0$ and an initial attitude $OR_0$ by the robot controller 50 in such a way that the indicator ID enters the visual field of the visual sensor 70. It is assumed that an image ($JD_n$) as illustrated in FIG. 6 is acquired.

(A2) The image processing unit 202 acquires coordinates ($x_n$, $y_n$) of an intersection F from an image of the indicator ID captured in the image $JD_n$ as the position of the indicator ID and acquires the area of a circle C as a size $IS_n$ (unit: pixels) of the indicator ID. The image processing unit 202 acquires a size RS (unit: mm) of the indicator ID in a real space, a focal distance FD of the optical lens of the visual sensor 70, a size SS (unit: mm/pixel) of the image sensor as previously saved data.

(A3) The image processing unit 202 acquires a vector ($X_n$, $Y_n$, $Z_n$) by using the acquired coordinates ($x_n$, $y_n$), the acquired size $IS_n$, the acquired size RS, the acquired focal distance FD, and the acquired size SS. Note that $X_n$ can be found from an equation $X_n = x_n \times IS_n \times SS/RS$. $Y_n$ can be found from an equation $Y_n = y_n \times IS_n \times SS/RS$. $Z_n$ can be found from an equation $Z_n = IS_n \times SS \times FD/RS$. The vector $(X_n, Y_n, Z_n)$ is a vector from the visual sensor 70 (i.e., the origin of the sensor coordinate system C3) to the indicator ID (specifically the intersection F) when the image data $JD_n$ are captured and are data indicating a relative position (or coordinates in the sensor coordinate system C3) of the indicator ID with respect to the visual sensor 70.

(A4) Similarly, from an image $JD_1$ of the indicator ID captured at a position $PS_1$ acquired by translating the visual sensor 70 from the initial position by a predetermined distance $\delta x$ in the x-axis direction of the flange coordinate system and at the attitude $OR_0$, the image processing unit 202 acquires a vector from the visual sensor 70 to the indicator ID when the image data $JD_1$ are captured.

(A5) Similarly, from an image $JD_2$ of the indicator ID captured at a position $PS_2$ acquired by translating the visual sensor 70 from the initial position by a predetermined distance $\delta y$ in the y-axis direction of the flange coordinate system and at the attitude $OR_0$, the image processing unit 202 acquires a vector from the visual sensor 70 to the indicator ID when the image data $JD_2$ are captured.

(A6) Similarly, from an image $JD_3$ of the indicator ID captured at a position $PS_3$ acquired by translating the visual sensor 70 from the initial position by a predetermined distance $\delta z$ in the z-axis direction of the flange coordinate system and at the attitude $OR_0$, the image processing unit 202 acquires a vector from the visual sensor 70 to the indicator ID when the image data $JD_3$ are captured.

(A7) From the data described above, the image processing unit 202 acquires a rotation matrix representing an attitude (W, P, R) of the visual sensor 70 (sensor coordinate system C3) in the flange coordinate system C2 by the following Equation (1).

[Math. 1]

$$M1 = \begin{pmatrix} (X_1 - X_0)/\delta x & (X_2 - X_0)/\delta y & (X_3 - X_0)/\delta z \\ (Y_1 - Y_0)/\delta x & (Y_2 - Y_0)/\delta y & (Y_3 - Y_0)/\delta z \\ (Z_1 - Z_0)/\delta x & (Z_2 - Z_0)/\delta y & (Z_3 - Z_0)/\delta z \end{pmatrix} \quad (1)$$

The robot controller 50 (focusing operation control unit 502) may be further configured to find the position of the sensor coordinate system C3 with the standard coordinate system set to the robot 10 as a basis. Operation procedures in this case are described below.

(B1) The robot controller 50 first sets a reference coordinate system C4 in the flange coordinate system C2 at the initial position $PS_0$ and the initial attitude $OR_0$. The robot controller 50 according to the present embodiment sets the reference coordinate system C4 in the flange coordinate system C2 in such a way that the origin of the reference coordinate system C4 is placed at the origin of the flange coordinate system C2 and the attitude (the direction of each axis) of the reference coordinate system C4 matches the attitude (W, P, R) acquired by the aforementioned procedure. Accordingly, the directions of the x-axis, the y-axis, and the z-axis of the reference coordinate system C4 are parallel to the x-axis, the y-axis, and the z-axis of the sensor coordinate system C3, respectively.

(B2) Next, the robot controller 50 operates the robot 10 and places the visual sensor 70 (i.e., the flange 11) at a position $PS_4$ and an attitude $OR_1$ by rotating the visual sensor 70 around the z-axis of the reference coordinate system C4 from the initial position $PS_0$ and the initial attitude $OR_0$ by an attitude variation $\theta_1$ (first attitude variation).

(B3) The image processing unit 202 operates the visual sensor 70 and captures an image of the indicator ID and acquires relative position data $(X_4, Y_4, Z_4)$ of the indicator ID with respect to the visual sensor 70 at this time, by a technique similar to that for finding the aforementioned attitude.

(B4) Next, the robot controller 50 operates the robot 10 and places the visual sensor 70 at a position $PS_5$ and an attitude $OR_2$ by rotating the visual sensor 70 around the x-axis or the y-axis (i.e., an axis orthogonal to the direction of the line of sight) of the reference coordinate system C4 from the initial position $PS_0$ and the initial attitude $OR_0$ by an attitude variation $\theta_2$ (first attitude variation).

(B5) The image processing unit 202 operates the visual sensor 70 and captures an image of the indicator ID and acquires relative position data $(X_5, Y_5, Z_5)$ of the indicator ID with respect to the visual sensor 70 at this time, by a technique similar to that for finding the aforementioned attitude.

Denoting a vector from the origin of the reference coordinate system C4 in the flange coordinate system C2 (the origin of the MIF coordinate system C2, according to the present embodiment) to the origin of the sensor coordinate system C3 the position of which is unknown by $(\Delta X_1, \Delta Y_1, \Delta Z_1)$, the following Equations (2) and (3) hold.

[Math. 2]

$$\begin{pmatrix} \cos\theta_1 & -\sin\theta_1 \\ \sin\theta_1 & \cos\theta_1 \end{pmatrix} \cdot \begin{pmatrix} X_0 + \Delta X_1 \\ Y_0 + \Delta Y_1 \end{pmatrix} = \begin{pmatrix} X_4 + \Delta X_1 \\ Y_4 + \Delta Y_1 \end{pmatrix} \quad (2)$$

[Math. 3]

$$\cos\theta_2 \cdot Y_0 - \sin\theta_2 \cdot (Z_0 + \Delta Z_1) = Y_5 \quad (3)$$

By solving the aforementioned Equations (2) and (3), the robot controller 50 can estimate the vector $(\Delta X_1, \Delta Y_1, \Delta Z_1)$ from the origin of the reference coordinate system C4 in the flange coordinate system C2 to the origin of the unknown sensor coordinate system C3.

As described above, the indicator ID is a visual pattern allowing determination of a relative positional relation between the visual sensor 70 and the indicator ID, and therefore the indicator ID may be used in place of the calibration jig J used in the aforementioned focusing operation.

As described above, placing a visual pattern at a detection target spot can cause the visual sensor to automatically focus on a spot where the visual pattern is placed, according to the present embodiment. In other words, focusing of the visual sensor can be performed automatically and efficiently.

While the present invention has been described above by using the typical embodiments, it may be understood by a person skilled in the art that changes, and various other changes, omissions, and additions can be made to the aforementioned embodiments without departing from the scope of the present invention.

The configuration described in the aforementioned embodiment is applicable to a focusing operation in various industrial machines equipped with a visual sensor on a movable part.

While the device configuration example illustrated in FIG. 1 is a configuration example in which the visual sensor is installed on the robot and the calibration jig is placed at a fixed position, a configuration in which the visual sensor is fixed in a workspace as a fixed camera and the calibration jig (visual pattern) is installed on the tool of the robot may be employed. A functional block configuration similar to the functional block configuration illustrated in FIG. 3 may also be applied in this case. In this case, the focusing operation control unit 502 causes the visual sensor to focus on the calibration jig (visual pattern) by causing the visual sensor to capture an image of the visual pattern while moving the visual pattern with respect to the visual sensor (while changing the relative position between the visual sensor and the visual pattern in a predetermined direction with the visual pattern as a basis), based on the determined relative positional relation, and finding a degree of focusing of the visual pattern, in a state of the visual pattern being captured in the visual field of the visual sensor.

The placement of the functional blocks in the visual sensor controller 20 and the robot controller 50 in the functional block diagram illustrated in FIG. 2 is an example, and various modified examples may be employed as the placement of the functional blocks. For example, at least part of the functions as the image processing unit 202 may be placed on the robot controller 50 side.

While an in-focus position is determined by comparing a degree of focusing with a degree of focusing reference value and determining whether the two match (step S4) in the focusing operation illustrated in FIG. 5, an in-focus position may be acquired by moving the camera in a predetermined operating range and searching for a position where a peak of a degree of focusing is acquired, instead of such a configuration.

A program for executing various types of processing including the focusing operation according to the aforementioned embodiment may be recorded in various computer-readable recording media (such as semiconductor memories including a ROM, an EEPROM, and a flash memory, a magnetic recording medium, and optical disks including a CD-ROM and a DVD-ROM).

REFERENCE SIGNS LIST

10 Robot
11 Flange
20 Visual sensor controller
21 Processor
22 Memory
23 Input-output interface
31 Tool
50 Robot controller
51 Processor
52 Memory
53 Input-output interface
54 Operation unit
60 Base
70 Visual sensor
100 Robot system
201 Input image
202 Image processing unit
203 Degree of focusing calculation unit
204 Calibration data storage unit

The invention claimed is:
1. An image processing system, comprising:
an industrial machine;
a visual sensor equipped on a predetermined movable part of the industrial machine;
a visual pattern for determining a relative positional relation between the visual sensor and the visual pattern placed at a detection target spot of a workpiece;
an image processing unit configured to determine the relative positional relation between the visual sensor and the visual pattern from an image of the visual pattern captured by the visual sensor; and
a focusing operation control unit configured to cause the visual sensor to focus on the visual pattern by
causing the visual sensor to capture the image of the visual pattern while moving, based on the determined relative positional relation, the visual sensor by the industrial machine to an in-focus position where the visual sensor focuses on the visual pattern to change a relative position between the visual sensor and the visual pattern in a predetermined direction with the visual pattern as a basis, and
finding a degree of focusing of the visual pattern, in a state of the visual pattern being captured in a visual field of the visual sensor, wherein
the visual sensor is calibrated in advance by using the visual pattern to obtain calibration data, and
the focusing operation control unit is configured to use the calibration data representing a position and an attitude of the visual sensor with a predetermined reference position in the industrial machine as a basis to direct the visual sensor to the predetermined direction with the visual pattern as a basis.

2. The image processing system according to claim 1, wherein
the focusing operation control unit is configured to change the relative position between the visual sensor and the visual pattern in the predetermined direction with respect to a plane on which the visual pattern is formed.

3. The image processing system according to claim 1, wherein
the focusing operation control unit is configured to
move the visual sensor in a predetermined operating range with respect to the visual pattern, and
move the visual sensor to the in-focus position by comparing a degree of focusing reference value when a degree of focusing of the visual pattern is highest with the degree of focusing acquired while moving the visual sensor.

4. The image processing system according to claim 1, wherein
the industrial machine is an industrial robot.

5. An image processing method, comprising:
determining a relative positional relation between a visual sensor and a visual pattern placed at a detection target spot of a workpiece from an image of the visual pattern captured by the visual sensor, wherein the visual sensor is equipped on a predetermined movable part of an industrial machine; and
causing the visual sensor to focus on the visual pattern by
causing the visual sensor to capture the image of the visual pattern while moving, based on the determined relative positional relation, the visual sensor by the industrial machine to an in-focus position where the visual sensor focuses on the visual pattern to change a relative position between the visual sensor and the visual pattern in a predetermined direction with the visual pattern as a basis, and
finding a degree of focusing of the visual pattern, in a state of the visual pattern being captured in a visual field of the visual sensor, wherein the visual sensor is calibrated in advance by using the visual pattern to obtain calibration data, and the method further comprises using the calibration data representing a position and an attitude of the visual sensor with a predetermined reference position in the industrial machine as a basis to direct the visual sensor to the predetermined direction with the visual pattern.

\* \* \* \* \*